(12) United States Patent
Feller

(10) Patent No.: US 9,970,797 B2
(45) Date of Patent: *May 15, 2018

(54) TRANSIT TIME FLOW METERING PROBE WITH REPEATING PAIR OF ULTRASONIC TRANSDUCERS CONNECTED IN PARALLEL

(71) Applicant: Onicon Inc., Largo, FL (US)

(72) Inventor: Murray F Feller, Micanopy, FL (US)

(73) Assignee: Onicon Inc., Largo, FL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/437,689

(22) Filed: Feb. 21, 2017

(65) Prior Publication Data

US 2017/0160115 A1  Jun. 8, 2017

Related U.S. Application Data

(63) Continuation-in-part of application No. 14/845,426, filed on Sep. 4, 2015, now Pat. No. 9,618,372.

(51) Int. Cl.
*G01F 1/66* (2006.01)
*G01F 5/00* (2006.01)
*G01F 15/00* (2006.01)

(52) U.S. Cl.
CPC .............. *G01F 1/662* (2013.01); *G01F 1/667* (2013.01); *G01F 5/00* (2013.01); *G01F 15/00* (2013.01)

(58) Field of Classification Search
None
See application file for complete search history.

(56) References Cited

U.S. PATENT DOCUMENTS

| | | | |
|---|---|---|---|
| 6,178,827 B1 * | 1/2001 | Feller | G01F 1/662 73/861.22 |
| 6,508,134 B1 * | 1/2003 | Feller | G01F 1/662 73/861.22 |
| 6,973,842 B1 | 12/2005 | Feller | |
| 7,252,015 B2 * | 8/2007 | Konzelmann | G01F 1/662 73/861.25 |
| 7,287,436 B2 * | 10/2007 | Lang | G01F 1/662 73/861.25 |
| 7,568,398 B2 | 8/2009 | Feller | |
| 2001/0015107 A1 * | 8/2001 | Feller | G01F 1/662 73/861.27 |
| 2006/0156829 A1 * | 7/2006 | Konzelmann | G01F 1/662 73/861.27 |
| 2009/0178490 A1 * | 7/2009 | Konzelmann | G01F 1/662 73/861.29 |

* cited by examiner

*Primary Examiner* — Harshad R Patel
(74) *Attorney, Agent, or Firm* — David Kiewit

(57) ABSTRACT

A transit time flow sensor is configured as an insertable probe carrying transducers spaced apart along an acoustic path that may be segmented. The transducers are attached to non-wetted surfaces of respective tabs extending outwardly from the probe and functioning as acoustic windows. The tabs are selectively skewed with respect to the probe's flow axis so that acoustic signals from one transducer are detected by another. Directly communicating transducers may be on the same or opposite sides of the probe's flow axis.

9 Claims, 5 Drawing Sheets

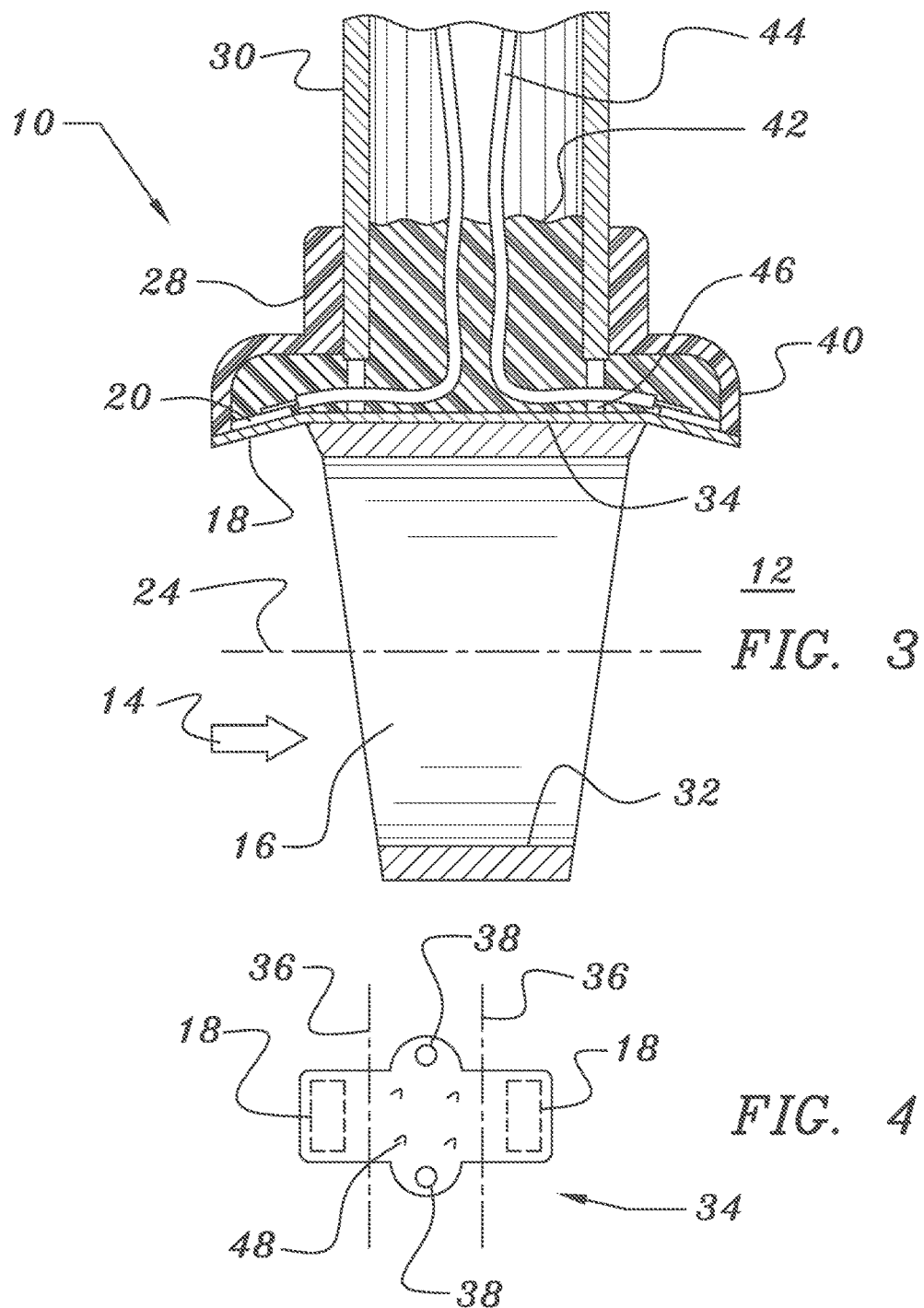

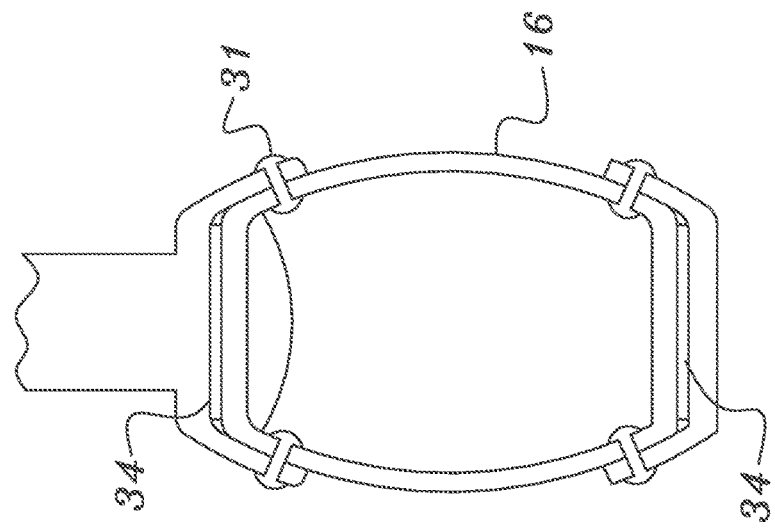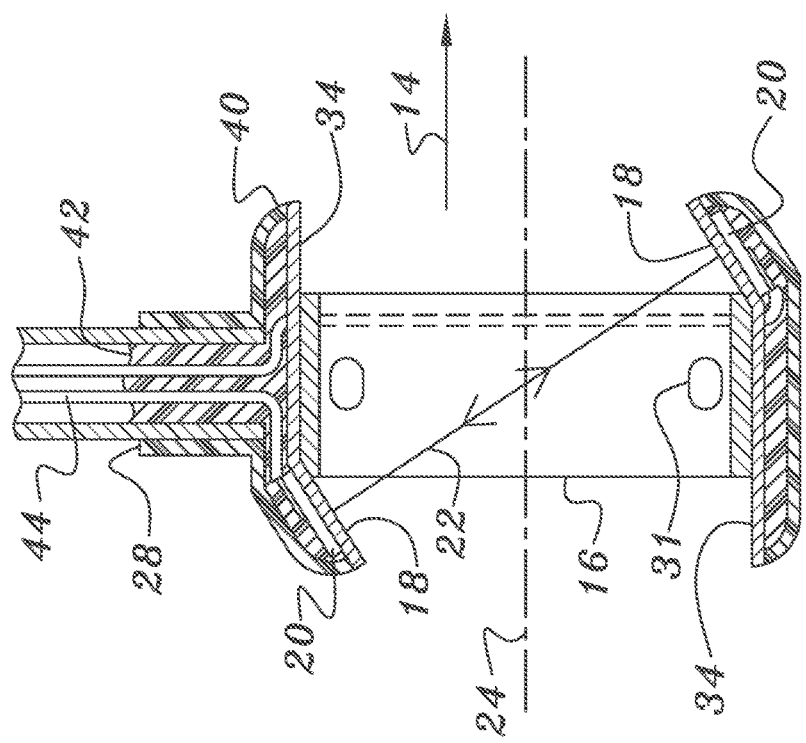

TRANSIT TIME FLOW METERING PROBE WITH REPEATING PAIR OF ULTRASONIC TRANSDUCERS CONNECTED IN PARALLEL

RELATED PATENT DOCUMENTS

This application is a continuation-in-part of utility patent application U.S. Ser. No. 14/845,426, filed on Sep. 4, 2015, and having the same inventor.

BACKGROUND OF THE INVENTION

The present disclosure relates to devices for determining the rate of flow of a fluid by means of an acoustic transit time measurement.

More specifically, the present invention relates to a transit time flow sensor configured as an insertable probe carrying two or more transducers spaced apart along an acoustic path. Sensing devices of this sort have been described by the inventor in his U.S. Ser. No. 6,973,842, the disclosure of which is hereby incorporated by reference.

BRIEF SUMMARY OF THE INVENTION

One aspect of the invention is that it provides a transit-time flow metering probe insertable into a fluid flowing along a flow direction. A preferred probe comprises a (preferably metallic) tubular portion, a pair of transducer mounting tab portions and a pair of transducers attached to respective tabs. In a preferred embodiment each of the tab portions has a wettable face proximal an axis of the tubular portion and a parallel environmentally sealed face distal therefrom. Each of these tab portions is skewed with respect to the axis by a respective angle selected so that the wettable surfaces of the tab portions define an acoustic path for signals generated by the transducers affixed to respective sealed surfaces of associated mounting tab portions.

Another aspect of the invention is that it provides a transit-time flow metering probe comprising a metallic tubular portion having a pair of transducer mounting tab portions extending outwardly from two ends thereof. This flow meter probe also comprises a pair of transducers attached to respective tabs skewed with respect to the axis by respective angles selected so that wettable surfaces of the tab portions lie along an acoustic path for signals generated by the transducers affixed to respective sealed surfaces of associated mounting tab portions.

Yet another aspect of the invention is that it provides a transit-time flow metering probe having a tubular portion with an axis aligned parallel to a flow direction. This probe comprises a plurality of transducer mounting tab portions spaced apart along the axis and skewed with respect to it. Each tab has a transducer attached to a non-wettable surface of an associated mounting tab. Each transducer is operable to transmit and receive acoustic signals propagating through the associated tab portion and along an acoustic path extending to another transducer.

A further aspect of the invention is that it provides a transit-time flow metering probe having a pair of transducer mounting tabs on opposite sides of the axis of a tubular portion of the probe. These tab portions are skewed with respect to the axis by angles selected so that wettable surfaces of the tab portions directly face each other to define an acoustic path. A pair of transducers are respectively attached to non-wettable surfaces of tabs. Each transducer is operable to transmit and receive acoustic signals propagating through their tabs and along the acoustic path.

Yet a further aspect of the invention is that it provides a transit-time flow metering probe having a metallic tubular portion comprising a repeating pair of transducers connected together in parallel and a signal generating and receiving pair of transducers mounted on respective wettable surfaces of tabs extending outwardly from the tubular portion. Each of the tabs is skewed with respect to the axis by a respective angle selected so that each wettable surface of one of the tab portions faces a respective one of the repeating pair of transducers so as to define an acoustic path segment. Each of the generating and receiving transducers transmit and receive acoustic signals through the associated tab and along the segmented acoustic path.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 3 is an axial cross-sectional view, similar to that of FIG. 2, of a second embodiment of the invention.

FIG. 4 is a plan view of a thin foil member used as a transducer mounting tab in the embodiment of FIG. 3.

FIG. 5 is an axial cross-sectional view of an embodiment of the invention having mounting tabs on opposite sides of the flow axis to provide direct communication between paired transducers.

FIG. 6 is a schematic axial view of the embodiment of FIG. 5.

DETAILED DESCRIPTION OF A PREFERRED EMBODIMENT

Figure 1:
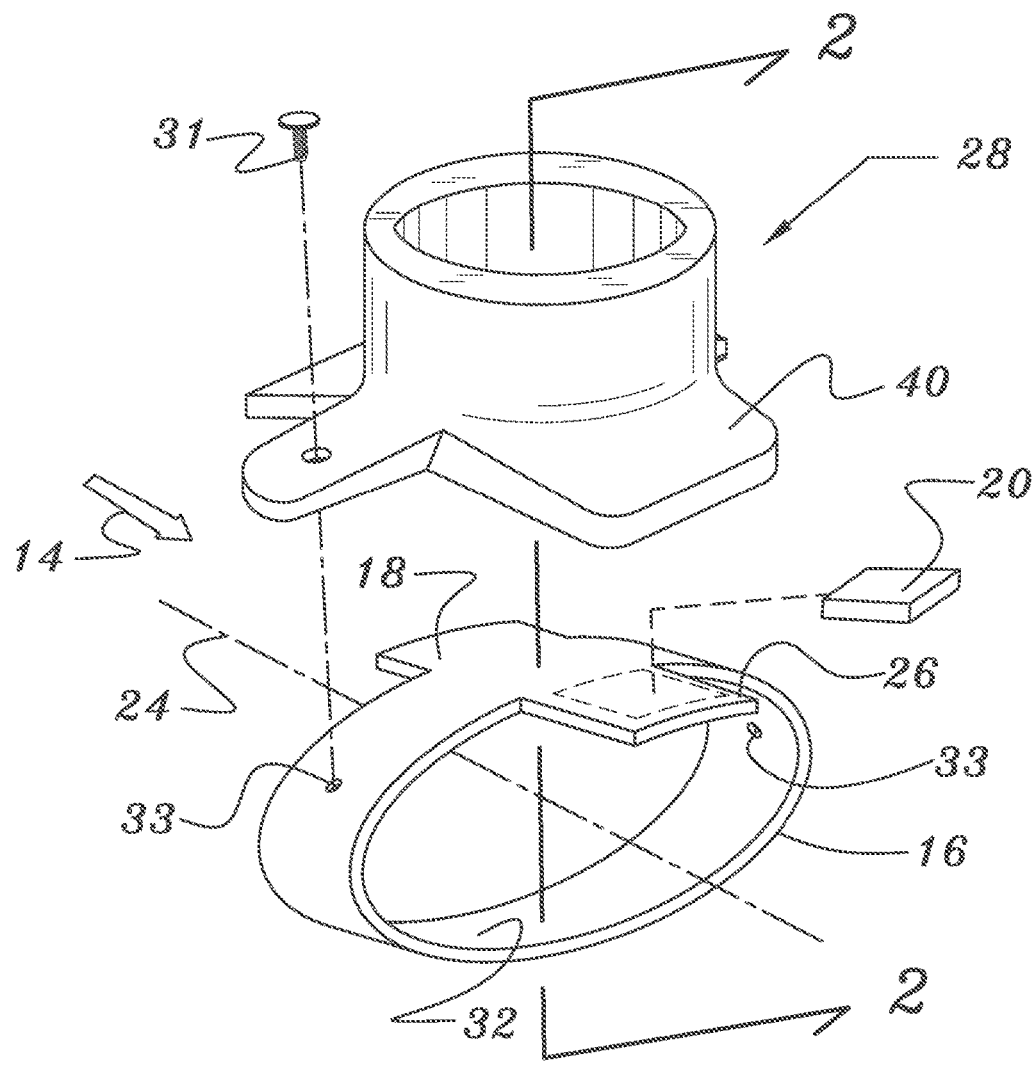
FIG. 1 is a partial exploded view of a first embodiment of the invention.

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

As noted above and schematically depicted in FIG. 2, one aspect of the invention is that it provides a transit-time flow metering probe 10 insertable into a fluid 12 flowing along a flow direction 14. Preferred embodiments of such a probe comprise a (preferably metallic) tubular portion 16, a pair of transducer mounting tab portions 18 and a pair of transducers 20 attached to respective tabs and communicating with each other along an acoustic path 22.

Turning now to FIG. 1, one finds a partial exploded view of an embodiment of a flow metering probe of the invention. In use, a tubular portion 16 of the probe is aligned so that its axis 24 is parallel to a flow direction 14. The tubular portion 16 has a respective tab portion 18 extending outwardly from each of its ends. A respective ultrasonic transducer 20, which is preferably a thin rectangular piezoelectric ceramic, is bonded to an outer, non-wettable, surface 26 of the associated tab (one of the transducers is omitted from FIG. 1 in the interest of clarity of presentation). A sealing member 28 is attached to the tubular portion of the probe so as to environmentally seal the transducers from whatever fluid is to be measured. A probe stem 30, as depicted in FIG. 2 and FIG. 3, is connected to the sealing member 28 to mechanically support the probe head.

In the depiction of FIG. 1 the sealing member 28 is connected to the tubular member 16 by means of a pair of screws 31 (only one of which is shown) cooperating with tapped holes 33. The reader should note that this fastening arrangement was used for experimental convenience and that any of a variety of suitable approaches, comprising, but not limited to, riveting, using self-tapping screws, and spot welding could be used to connect the sealing and tubular members.

Figure 2:
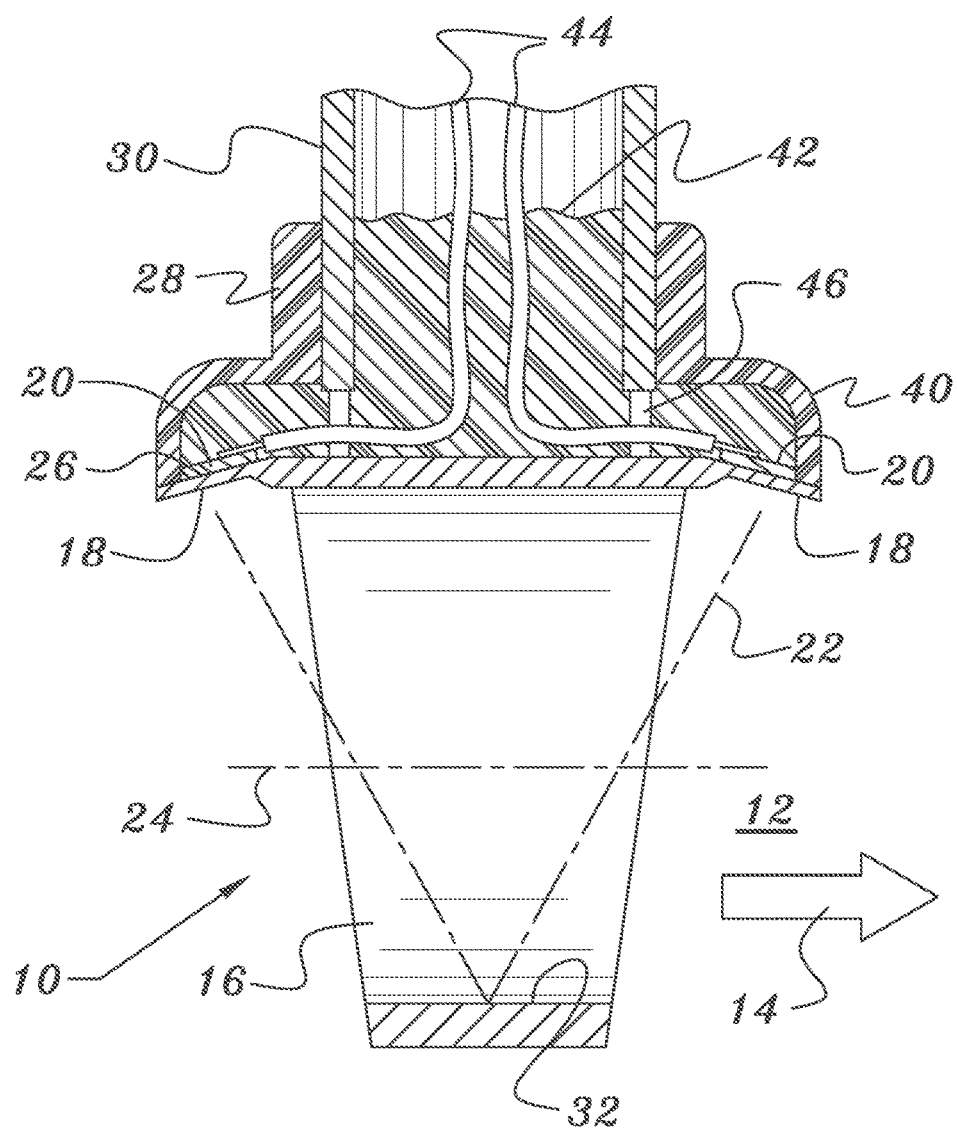
FIG. 2 is an axial cross-sectional view of the embodiment of FIG. 1, the view taken as indicated by the double headed arrow 2-2 in FIG. 1.

In the embodiment depicted in FIG. 1 an acoustic path 22, schematically indicated in FIG. 2, for transit time flow measurement is preferably provided by skewing the tabs 18 with respect to the axis 24 of the tubular portion by an angle selected so that an acoustic signal emitted by one of the transducers is reflected from an internal wall 32 of the tubular member and received by the other transducer. The acoustic reflector portion of the inside surface 32 may be provided by various means. These comprise, but are not limited to: machining the tubular portion from a block of metal with a flattened, reflective portion; selectively deforming a cylindrical tubular portion; and using a tubular portion having a rectangular cross-section. In tested devices both tabs were skewed by roughly the same angle so as to yield a symmetrical acoustic path. The reader will appreciate that this was a matter of convenience and that embodiments of the invention embrace somewhat asymmetrical paths associated with disparate bend angles.

In a first embodiment, depicted in FIGS. 1 and 2, the tab portions may be formed from a wall of the tubular portion by a suitable operation, such as machining, and then bent about a line perpendicular to the axis into a suitable orientation to define the acoustic beam 22. In this embodiment the transducer 20 is bonded onto a surface of the tab 18 distal from the tube axis 24 (also referred to as the non-wettable, outer, or sealed surface) so that the tab provides an acoustic window having an inner, wettable surface that is in contact with the flowing fluid when the apparatus is in operation. The window portion of the tab is preferably made thin to reduce acoustic losses. Thus, making a probe head may involve thinning at least a portion of each tab if the tube wall is relatively thick. Many sorts of approach to thinning may be considered. These include, but are not limited to conventional machining, EDM, and etching. The thinning operation may be carried out either before or after the bending step. Moreover, material may be removed from only selected regions of the tab.

As shown in FIGS. 3 and 4, the tab portions 18 may be provided by one or more separate thin sheet(s) 34 of material sandwiched between the tubular portion 16 and the sealing member 28. This approach allows one to have a tab that is very thin (e.g., 0.005") and that has a thickness selected for resonant operation with available ceramic transducers operated in thickness mode. In one example of this embodiment, using a sheet 34 depicted in FIG. 4, the tab portions can be formed from a flat metal sheet by bending along the double-dotted phantom lines 36. The attachment ear portions 38 can be deformed about the long edges of the sheet so that the sheet can be captured between the sealing member and the tubular member with the holes in the sheet 34 aligned with the holes 33 in the tubular member. In another variation two separate thin sheets set perpendicular to each other were used. In this example one sheet provided the two transducer mounting tabs while the other, which extended between two mounting screws 31, was used to strap the first sheet into place between the tubular portion 16 and the sealing member 28.

A sealing member 28 preferably connects the probe head 10 to a probe stem 30. Preferably, when a thin separate sheet 34 is used for the tab portions, the tab-covering edge portions 40 of the sealing member adjacent the transducers provides the desired working angle for the acoustic path. That is, one can clamp the thin flexible tabs 18 to rigid edges of the tab-covering portions 40 of the sealing member 28 during the process of environmentally encapsulating the transducers, generally with a cured epoxy 42.

In an experimental trial using integrally formed tabs extending outwardly from the ends of a tubular portion a probe head was made in which the separate sealing member did not have a tab-covering portion. The bottom electrodes of the transducers were soldered to the tabs so that the tubular portion provided a common ground connection when assembled so that the tubular portion was in electrical contact with the stem. Separate insulated wires 44 attached to the transducers' top electrodes were pulled through slots 46 into a stem 30. The initially exposed transducers and leads were then environmentally sealed with an epoxy 42 that was also used to pot the leads inside the stem.

In a preferred assembly process one side of each of the transducers is metallically connected to an associated electrically conducting tab (e.g., by soldering). Lead wires 44 are then respectively connected to the second (outer) sides of the transducers. The tubular member 16, tabs 18, lead wires 44, sealing member 28 and stem 30 are then assembled. The stem 30 may have two slits 46 at its inserted end so that the insulated lead wires 44 can be pulled through the stem 30. This configuration allows the inserted end of the stem to be in metallic contact with the tab portions which provides the ground contact for both transducers. The assembled unit is then clamped together and the chamber so formed is filled with an appropriate encapsulant 42.

Note that in embodiments employing thin metal foils special care is taken to assure that the foils are held against the tab-covering portions 40 of the sealing member 28 while the encapsulant 42 cures. Moreover, a preferred foil 34 is springy and may have dimples, domes, or other surface features 48 in a region contacted by the stem. This arrangement can improve reliability of the electrical ground contact between the stem and the transducer mounting tabs in that it provides a spring bias forcing the foil and stem together. This bias may be enough to overcome degradation of contact quality associated with thermal expansion mismatches, mechanical shocks, etc.

Figure 7:
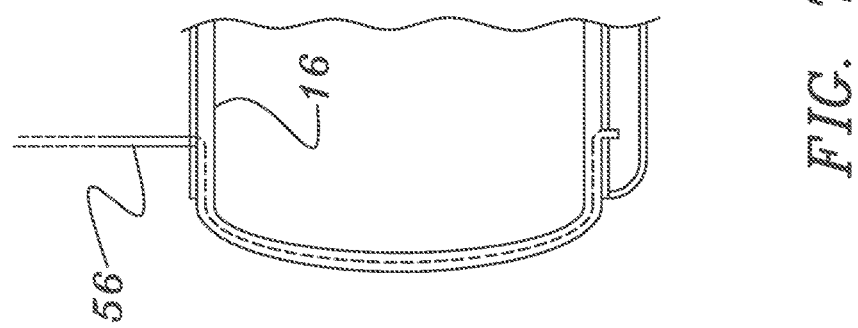
FIG. 7 is a partial cut-away view showing details of a wiring arrangement used in the embodiment of FIGS. 5 and 6.

Putting a reflector 32 in the acoustic path may corrupt the acoustic signal wave front unless care is taken to shape the reflector to reduce dispersion in transit times from portions of the signal from off center parts of the reflector. This problem can be minimized by eliminating the reflector 32 and having the wettable surfaces of the two tab windows directly face each other. One approach to doing this is to provide tabs 18 on opposite sides of the tube axis 24 and relocating one of the transducers 20 so that it is diagonally spaced apart from the other. The skew angles are selected so that there is direct acoustic communication along a straight line between the two tab windows, as depicted in FIGS. 5-7. In an arrangement of this sort the electrical connection to the transducer distal from the stem 30 may be made with an insulated wire 56 that is nested within a groove cut into the tubular portion 16, as shown in the simplified end view of FIG. 7. An epoxy seal would typically secure the wiring against environmental hazards.

Figure 8:
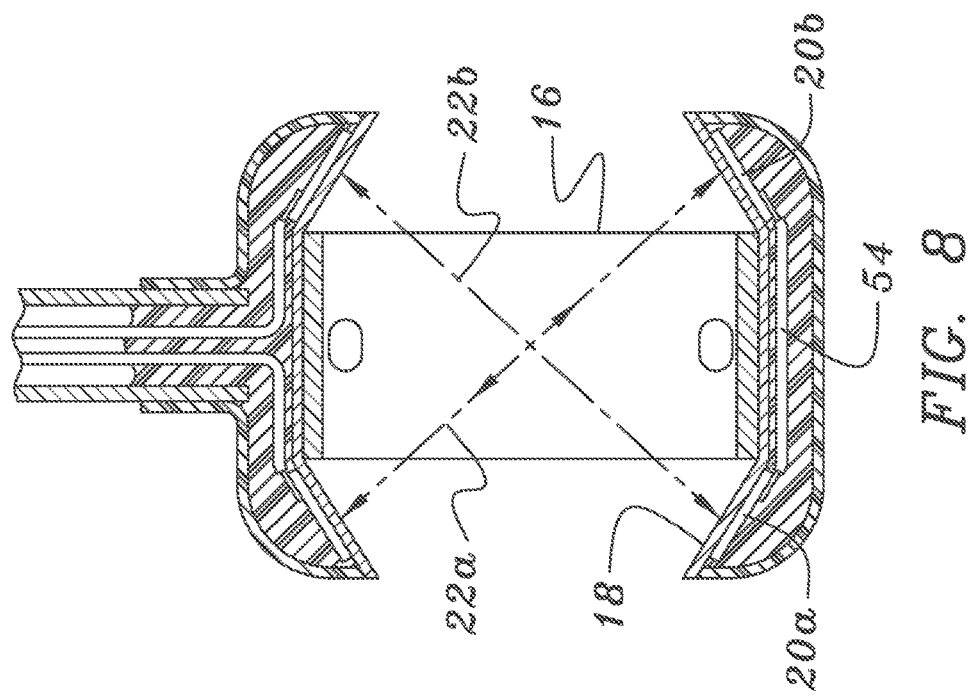
FIG. 8 is a partial cross-sectional view of an embodiment in which a repeater structure replaces the reflector shown in the embodiment depicted in FIGS. 1-4.

In yet a further embodiment, depicted in FIG. 8, the reflector 32 is replaced by a repeating pair 20a, 20b of transducers wired together in parallel so that the signal received by one is transmitted by the other. This approach is taught by the inventor in his U.S. Pat. No. 7,568,398, the disclosure of which is herein incorporated by reference. This yields a segmented acoustic path 22a, 22b having a total length comparable to that of the acoustic path of the reflective configuration of FIGS. 1-3 and roughly twice the length of the straight-line embodiment depicted in FIG. 5. Doubling the path length for a given fluid flow rate doubles the transit time and thereby improves the quality of the flow rate measurement. Moreover, the wiring 54 connecting the repeating pair 20a, 20b is local to the repeating pair enclosure and does not require routing wiring from one side of the tubular body to the other.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. A transit-time flow metering probe insertable into a fluid flowing along a flow direction, the probe comprising:
    a tubular portion having two ends and an axis alignable parallel to the flow direction, the tubular portion further comprising a plurality of transducer mounting tab portions spaced apart along the axis and skewed thereto by respective selected angles; and
    a plurality of transducers, each respectively attached to a respective non-wettable surface of an associated mounting tab portion, each transducer operable to transmit and receive acoustic signals propagating through the associated tab portion and along an acoustic path extending to another of the plurality of transducers.

2. The metering probe of claim 1 wherein the plurality of transducers consists of one pair thereof and wherein the associated mounting tab portions directly face each other to define the acoustic path.

3. The metering probe of claim 1 wherein the plurality of transducers consists of one pair thereof and wherein the acoustic path comprises a reflecting portion of the probe.

4. The metering probe of claim 1 wherein the plurality of transducers comprises at least four transducers, two of which comprise a repeating pair; and wherein the acoustic path comprises a plurality of path segments.

5. A transit-time flow metering probe insertable into a fluid flowing along a flow direction, the probe comprising:
    a tubular portion having two ends and an axis alignable parallel to the flow direction;
    a pair of transducer mounting tab portions disposed on opposite sides of the axis of the tubular portion and spaced apart along the axis, the tab portions skewed with respect to the axis by respective angles selected so that the wettable surfaces of the tab portions directly face each other to define an acoustic path; and
    a pair of transducers respectively attached to non-wettable surfaces of associated mounting tab portions, each transducer operable to transmit and receive acoustic signals propagating through the respective tab portion and along the acoustic path.

6. The transit-time probe of claim 5 wherein the mounting tab portions are disposed on opposite sides of the axis of the tubular portion.

7. A transit-time flow metering probe insertable into a fluid flowing along a flow direction, the probe comprising:
    a tubular portion having two ends and an axis alignable parallel to the flow direction, the tubular portion comprising a first, repeating, pair of transducers connected together in parallel;
    a pair of transducer mounting tab portions extending outwardly from the tubular portion and spaced apart along a line parallel to the axis thereof, each of the tab portions having a wettable surface proximal the axis and a parallel non-wettable surface distal therefrom, each of the tab portions skewed with respect to the axis by a respective angle selected so that each wettable surface of the tab portions faces a respective one of the repeating pair of transducers so as to define an acoustic path segment therebetween; and
    a second pair of transducers respectively electrically and mechanically attached to the non-wettable surfaces of associated mounting tab portions, each transducer of the second pair thereof operable to transmit and receive acoustic signals through the respective associated tab portion and along the acoustic path comprising a plurality of the acoustic path segments.

8. The transit-time flow metering probe of claim 7 wherein each of the repeating pair of transducers is respectively attached to a non-wettable surface of a respective one of a second pair of transducer mounting tab portions skewed with respect to the axis by respective angles.

9. The transit-time flow metering probe of claim 7 wherein the tubular portion is metallic and each of the first and second pairs of transducers has one electrode directly electrically connected to the tubular portion.

* * * * *